(12) United States Patent
Howell et al.

(10) Patent No.: US 7,801,409 B2
(45) Date of Patent: Sep. 21, 2010

(54) GLITCH-FREE REALTIME PLAYBACK

(75) Inventors: Gareth Alan Howell, Kirkland, WA (US); Olivier Colle, Redmond, WA (US); Rebecca C. Weiss, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 1514 days.

(21) Appl. No.: 10/804,812

(22) Filed: Mar. 19, 2004

(65) Prior Publication Data
US 2005/0207734 A1 Sep. 22, 2005

(51) Int. Cl.
*H04N 5/91* (2006.01)

(52) U.S. Cl. .............................. 386/46; 725/86; 725/94
(58) Field of Classification Search .................... 386/46
See application file for complete search history.

(56) References Cited

U.S. PATENT DOCUMENTS

2004/0268397 A1* 12/2004 Dunbar et al. ................. 725/88

\* cited by examiner

*Primary Examiner*—Marsha D Banks Harold
*Assistant Examiner*—Daniel Tekle
(74) *Attorney, Agent, or Firm*—Lee & Hayes, PLLC

(57) ABSTRACT

Described herein is a technology for facilitating playback of video segments (with transforms applied therein) which can be both glitch-free and realtime.

16 Claims, 2 Drawing Sheets

GLITCH-FREE REALTIME PLAYBACK

TECHNICAL FIELD

This invention generally relates to a technology for facilitating playback of multimedia (e.g., video and audio).

BACKGROUND

Many video editing products exist for capturing and editing multimedia content, such as video. Many of these products are software running on computing systems. Many of these products allow the user to render a final product for storage on tape, hard drive, CD-ROM, and DVD or for distribution over a network.

With these products, a user typically captures several video clips. When editing, the user builds a timeline of video clips, which the user has selected from the captured clips. At this point, it is a collection of video clips strung together on a timeline.

Transitions

Sometimes simple cuts from one clip to the next work well, but sometimes the cut is harsh and unappealing. Therefore, many video editing products offer the user the option to include a transition from one clip to another. Common examples of transitions include dissolves, wipes, and fades. Often using a drag-and-drop technique, a user selects a transition and the two clips to transitions between. For example, if the user chooses a fade-out/fade-in transition, clip one will fade-out and then clip two will fade-in.

The user needs not calculate how to perform such transitions. Rather, when the completed "movie" is rendered from the editing application, the video editing product calculates and renders the transitions from one clip to the next.

However, the user typically wants to see how this transition will appear without rendering the entire movie and encoding/archiving to a separate file-which can be time-consuming. Indeed, it is quite common for the user to want to see the transition nearly immediately after placing it into timeline of clips.

Glitchy Realtime Playback

If the user immediately watches just the portion of the movie with the new transition therein, the user might experience glitchy realtime playback. This is because the system is attempting to apply the transition in real-time during playback, when in fact the computations involved are too complex to be done in real time.

In those situations, user will see a glitch, interruption, jumpiness, or jerkiness in the video playback, or the video might just play back too slowly. In other words, the playback will not be smooth. Therefore, the user may believe that some error has occurred in the creation of the movie, but, in reality, it is only that the transitions cannot be computed on the fly in real time during playback.

It is a "realtime" playback because the intent is for the computer system to display the rendered playback video segment at the same rate or, at least, no slower than it decodes and renders it. Indeed, there is typically a normal decode schedule that specifies the normal rate for decoding a segment of video. Often the rendering and displaying a video segment matches the decode schedule. The realtime playback has a glitch when rate of rendering or displaying a video segment exceeds the rate of decoding that segment.

With some systems and in some situations, the momentary processing requirements for generating the newly inserted transitions between scenes and the processing requirements for realtime playing back the video may exceed the total available processing capacity.

In other words, the decoding and rendering of a video segment (including its transition) may require more than all of the available computing resources on a computer system at a given moment. An example of such a situation when one is attempting to play back a transition between two encoded video clips.

The chances of such a glitch occurring during a realtime playback increase along with the overall bandwidth of the video clips (which includes resolution and number of frames per second) and the complexity of the transform being applied. This is particularly true as high-definition (HD) television and video equipment is becoming increasingly more common.

The chances of a glitch also increase with the complexity of the transition being performed. It decreases with the overall processing power of the computer system doing the playback.

Conventional: Glitch-Free Playback

Some conventional video editing products do nothing to avoid the possibility of a glitchy realtime playback. They simply hope that computer processing power will exceed the processing requirements of realtime playback. However, as indicated above, that "hope" is slowing fading because the overall bandwidth of video is increasing (especially with the advent of HD video onto the market).

Some conventional products attempt to avoid the problem of glitchy playback by introducing a delay that removes the "realtime" aspect of the playback.

These conventional products pre-render the segment of video having the transitions therein. In other words, the product begins rendering the video segment having the transitions in anticipation of the user wishing to view that segment. So when playing back that segment, it shows the already pre-rendered segment.

"Pre-rendering" refers to writing a video segment to disk with transitions and effects applied so that this output can be played back without having to apply those transitions and effects in real time. Pre-rendering is a time-consuming operation that interrupts the users workflow.

To allow for pre-rendering, the user's playback is delayed. Therefore, it no longer realtime playback. Instead, the playback is based, at least in part, on pre-processing.

While that delay introduced by pre-rendering may be short, the user is prohibited from immediate playback. Indeed, that pre-rendering delay will only increase as the video bandwidth and the complexity of the transition does.

No conventional video editing product allows for immediate playback of video segments (with transitions applied therein) which is both glitch-free and realtime.

SUMMARY

Described herein is a technology for facilitating playback of video segments (with transforms applied therein) which can be both glitch-free and realtime.

DESCRIPTION OF THE DRAWINGS

The same numbers are used throughout the drawings to reference like elements and features.

DETAILED DESCRIPTION

The following description sets forth techniques that facilitate immediate playback of video segments (with transforms applied therein) which can be both glitch-free and realtime. The techniques may be implemented in many ways, including (but not limited to) via program modules, on computer systems, dedicated electronics (such as multimedia appliances) and on computer networks.

An exemplary implementation of these techniques may be referred to as an "exemplary realtime playback system" and is described below.

Exemplary Realtime Playback System

Figure 1:
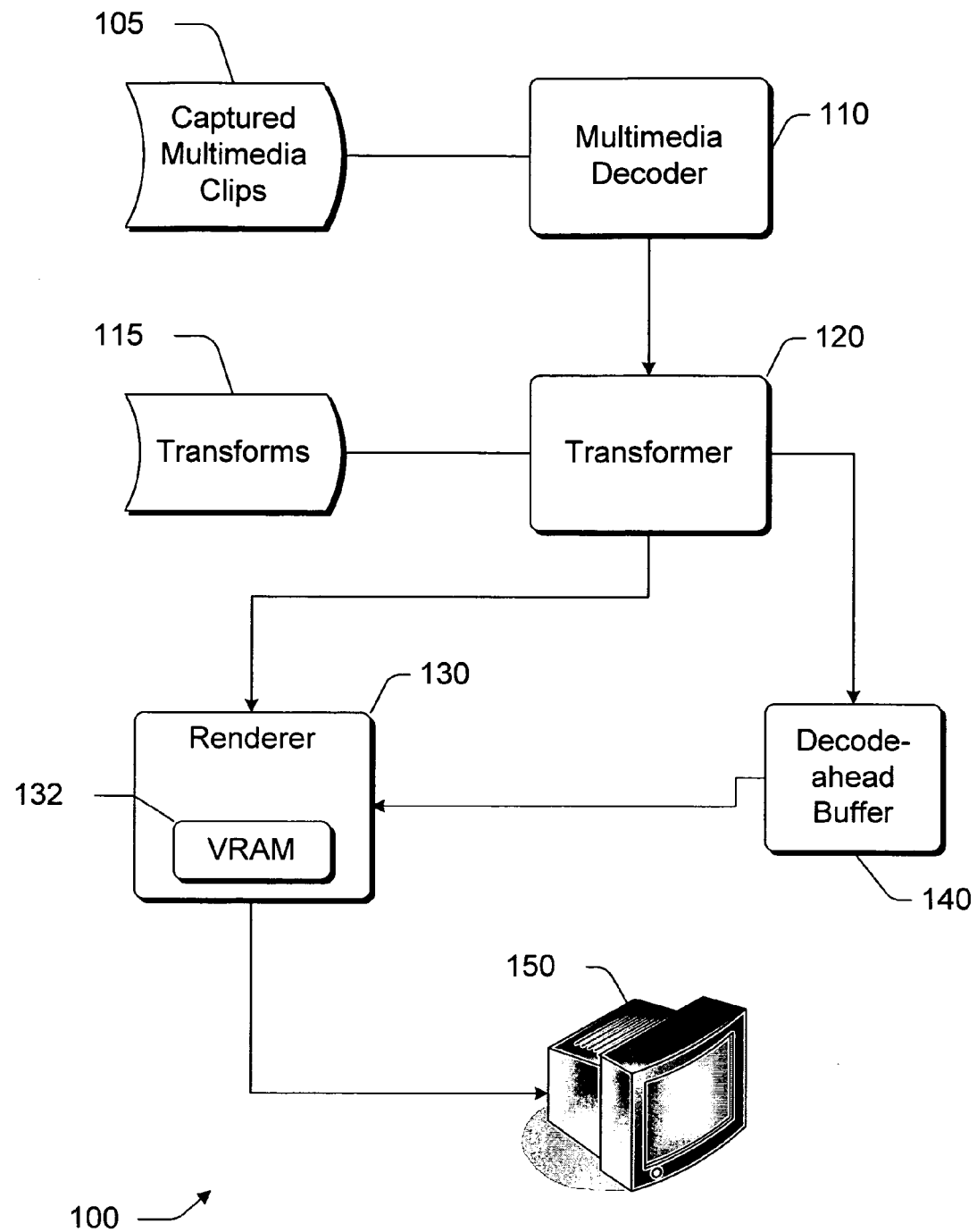
FIG. 1 is a schematic block diagram in accordance with an implementation described herein.

FIG. 1 illustrates at least a portion of a video editing system 100. That portion implements the exemplary realtime playback system. It may be implemented as a program module which operates on a computing system. For example, it may be part of video editing software product or it may be implemented as part of a video editing appliance.

With the video editing system 100, a user builds a timeline of captured multimedia clips 105, such as video clips. Such clips may also be called multimedia signals. The user may insert a transition (e.g., dissolves, wipes, and fades) between clips. Alternatively, the user may apply some effect some segment of the video (regardless of whether two clips border each other). An example of a video effect is "Film Age" (to give it that old-fashioned look).

These transitions and effects are called "transforms" herein. The various transforms that the video editing system 100 makes available may be stored in a database 115 of such transforms. Other examples of transforms include titling, transitions, picture-in-picture, effects, or any two or three dimensional video transformation.

To playback a video segment with a just-applied transform ("transformed video segment" herein), the multimedia decoder 110 decodes the video segment. That segment may include first video clip followed by a second one.

At a designated point in the decoding of the video segment, the transformer 120 calculates the effect of the transform (such as a transition between clips) on the video segment. The renderer 130 renders the decoded (and transformed) video segment and displays it on display 150.

On a conventional system, when the above actions (of decoding, transforming, and rendering) are performed in realtime, the resulting playback often stutters and skips. This is often called a "glitch."

For example, in a conventional scenario, a typical 720×480 video clip can take anywhere from 40%-55% of the available computing resources to play back, and the transition may take another 10-15% of the resources.

So with two clips and the transition, approximately 90%-125% of the available resources are required to perform a realtime playback the video segment without a glitch in a conventional scenario. This means that it is likely that conventional realtime playback will glitch.

Examples of computing resources include CPU cycles, memory, and system bus bandwidth. Also, the focus here is only "available" resources. Resources dedicated to other computing tasks are effectively unavailable.

The exemplary realtime playback system takes advantage of the fact that there are spare computing resources available while playing back the timeline in realtime. For example, there are spare resources available while playing back the first video clip since it only takes 40%-55% of the resources to play back that clip.

While the first video clip is playing back, the decoder 110 of the video editing system 100 utilizes those otherwise unused computing resources to decode ahead in the timeline and get a few seconds ahead of playback. This "decoding ahead" during the realtime playback effectively smoothes over the temporary peaks in usage of computing resources. This allows the timeline to playback glitch-free and in realtime.

Since the decoder 100 is decoding ahead, the transformer 120 is able to effectively transform ahead as well. In some instances, there may not be any transform being applied. If so, the decoded-ahead portion of the video segment by-passes or passes-through the transformer 120.

The video segment that is decoded (and possibly transformed) ahead of when it is needed is stored in one or more buffers 140. It may be called a "decode-ahead" buffer. The renderer 130 receives the decoded-ahead portion of the video segment when such portion is scheduled for rendering and display. The renderer 130 is typically implemented on a hardware video card and includes video memory (VRAM) 132. In one or more implementations described herein, the decode-ahead buffer 140 may reside in VRAM 132 or in the system memory of a computing system.

VRAM is used to store image data for a computer display. Video RAM is really a buffer between the computer processor and the display and is often called the frame buffer. When images are to be sent to the display, the image data is written to VRAM. From VRAM, the image data is converted by a RAM digital-to-analog converter (RAMDAC) into analog signals that are sent to the display presentation mechanism, such as a cathode ray tube (CRT).

Typically, VRAM is located on dedicated video processing hardware (such as video card) in the computer. Most forms of VRAM are dual-ported, which means that while a processor is writing a new image to VRAM, the display is reading from VRAM to refresh its current display content. The dual-port design is one of the main differences between system memory and video RAM.

With exemplary realtime playback system, the user is able to immediately (without any delay) playback a transformed video segment in realtime and does so glitch-free. Unlike the conventional approaches, there does not need to be a delay instituted to pre-render the transformed video segment. The exemplary realtime playback system effectively accumulates a head start while playing back the video segment. It takes advantage of times when less than all of the available resources are utilized to get ahead.

Alternatively, this head start is obtained up-front, wherein the actual display of the video segment is delayed a very brief amount of time (on the order of a second or two) while the exemplary realtime playback system buffers decoded-ahead portion of video. This has the cost of a slightly increased startup time.

Exemplary Embodiments

This section describes several examples of embodiments of the exemplary realtime playback system. Of course, these are just examples and other embodiments are within the scope of the appended claims.

In one embodiment, the decode-ahead buffer 140 is located in the primary system memory of a computing system. It is often simply called RAM (Random Access Memory) and it is typically accessed via a system bus.

In another embodiment, the decode-ahead buffer 140 is located within the VRAM 132 of the renderer 130. This allows for particularly quick read/write times and quick data transfer for the renderer 130.

Also, this allows for the GPU (graphic card CPU) to be used for all video transforms. Let's assume that one stores in the system memory of the computing system instead in a VRAM, but that one uses the GPU for the transforms. In this case, one would have to copy the input frames into the VRAM, perform the transition using the GPU, and then bring back the resulting frame into the system memory. This last operation is extremely costly in terms of computing resources and time. By storing into VRAM, one avoids this last step, and takestake advantage of the GPU for all video transforms.

In still another embodiment, the transformer 120 is co-located with the renderer 130 on dedicated video hardware and the decode-ahead buffer 140 is located within the VRAM 132 on the hardware. Some dedicated video hardware offer hardware accelerated transformations. In these instances, the decoder 110 decodes video segment directly into VRAM 132 of the renderer 130. The transformer 120 performs hardware accelerated transformations on the decoded video segments in the VRAM 132 and stores the results in the buffer 140 within the VRAM.

In yet another embodiment, the decoder 110 and transformer 120 are co-located with the renderer 130 on dedicated video hardware and the decode-ahead buffer 140 is located within the VRAM 132. Some dedicated video hardware offer hardware accelerated transformations and decoding. In these instances, the decoder 110 performs hardware accelerated decoding of the video segment directly into VRAM 132 of the renderer 130. The transformer 120 performs hardware accelerated transformations on the decoded video segments in the VRAM 132 and stores the results in the buffer 140 within the VRAM.

Methodological Implementation

Figure 2:
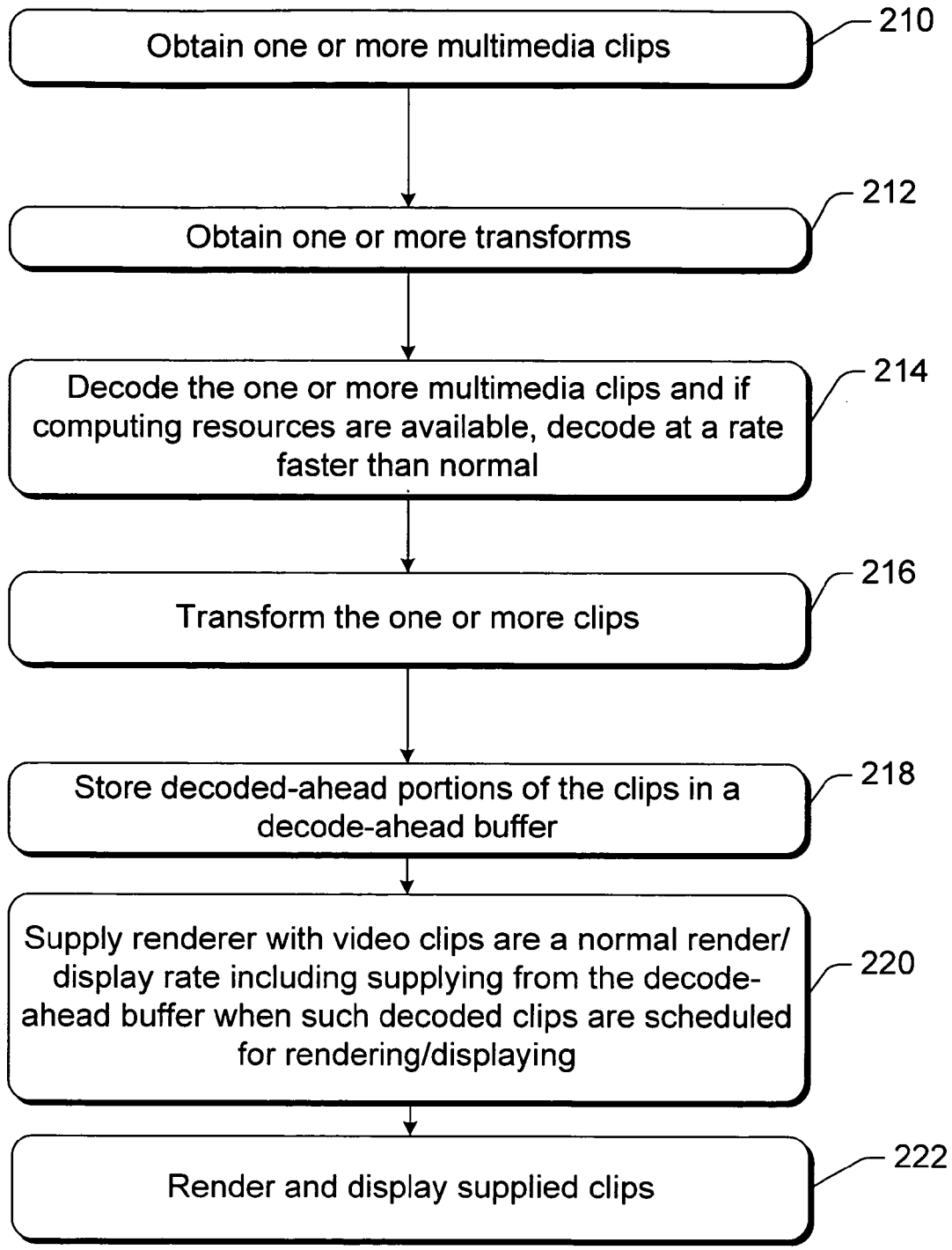
FIG. 2 is a flow diagram showing an illustrative methodological implementation described herein.

FIG. 2 shows a methodological implementation of the exemplary realtime playback system). This methodological implementation may be performed in software, hardware, or a combination thereof. For ease of understanding, the method steps are delineated as separate steps; however, these separately delineated steps should not be construed as necessarily order-dependent in their performance.

At 210 of FIG. 2, the multimedia decoder 110 obtains one or more multimedia clips.

At 212, the transformer 120 obtains one or more transforms from a database 115 of such.

At 214, the decoder 110 decodes the one or more clips. While doing that, the exemplary realtime playback system monitors whether there are spare computing resources available. If so, the decoder 110 increases its rate of decoding to utilize some or all of the otherwise spare resources. Decoding/transforming happens as quickly as computing resources will allow, subject to the constraint of how much decode-ahead buffer space is available. This increased rate of decoding may or may not be the same as the normal decoding rate specified for the video clips being decoded; for simple clips, though, it can be expected to be faster.

At 216, the transformer 120 receives the one or more decoded clips and applies the one or more transforms to them. For example, it may produce a fade-out from one clip and a fade-in to another one. Since the decoder 110 is supplying decoded clips at a rate greater than normal, the transformer 120 matches (or at least come close to doing so) the increased rate.

At 218, the decoded-ahead (and possibly transformed-ahead as well) portions of the clips are stored in the decode-ahead buffer 140. The renderer 130 is not yet ready to render these clips.

At 220, the exemplary realtime playback system supplies the renderer 130 with clips at a normal render/display rate for such clips. That includes supplying decoded-ahead clips from the decode-ahead buffer 140 when they are scheduled to be rendered/displayed.

At 222, the exemplary realtime playback system renders and displays the supplied clips at a normal rate that the clips are scheduled to be rendered and displayed.

Note that while the frames of the decode-ahead buffer 140 are being rendered in real time (e.g. 30 fps), the exemplary realtime playback system is still it filling the buffer. Frame computation happens at the same time as frames are being rendered and, indeed, it will occur:

when more computer resources are available, the frame computation will occur faster than frames of the decode-ahead buffer are being rendered; and when less computer resources are available, the frame computation will occur slower than frames of the decode-ahead buffer are being rendered.

Conclusion

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. One or more processor-readable media having processor-executable instructions that, when executed by a processor, performs acts comprising: obtaining at least one of a plurality of encoded multimedia clips, the plurality of encoded multimedia clips collected in a timeline of a video editing system, each clip having a defined normal decode schedule which designates a normal rate for decoding the multimedia clip; obtaining one or more transforms; wherein the one or more transforms comprise a multimedia transition, a multimedia effect, or titles; decoding the plurality of encoded multimedia clips, wherein the decoding comprises decoding at least one encoded multimedia clip at a rate greater than the normal decode schedule; applying the one or more transforms to at least one of the plurality of decoded multimedia clips to form a multimedia segment; buffering the multimedia segment in a system memory; real-time glitch-free normal playback of the just-buffered and just-decoded multimedia segment, wherein the real-time glitch-free normal playback comprises-rendering and presenting the just-buffered and just-decoded buffered multimedia segment such that the just-buffered and just-decoded multimedia segment is played back without glitch, interruption, jumpiness, jerkiness, or change in playback speed; and determining whether to perform the decoding and buffering when spare computing resources are otherwise available to decode ahead in the timeline.

2. One or more media as recited in claim 1, wherein the obtaining one or more transforms comprises obtaining at least one of a plurality of transforms stored in a database of the video editing system.

3. One or more media as recited in claim 1, wherein the one or more transforms comprise a transition between one portion of the multimedia segment and another portion.

4. One or more media as recited in claim 1, wherein the buffering occurs in a video memory.

5. One or more media as recited in claim 1, wherein:
one or more of the acts recited in claim 1 are performed concurrently;
concurrent acts comprising the decoding, the buffering, the rendering and the presenting;
performance of each act consumes computing resources; and
the overall consumption of computing resources for concurrent performance of one or more of the acts does not exceed the resources available.

6. One or more media as recited in claim 2, wherein one or more of acts are performed via dedicated hardware, where those acts are selected from decoding, transforming, buffering, and rendering.

7. A system for facilitating glitch-free real-time playback of a multimedia segment from a within a video editing system, the system comprising: a decoder configured to decode an encoded multimedia segment, the encoded multimedia segment comprising at least one of a plurality media clips collected in a timeline of the video editing system, wherein the encoded multimedia segment has a defined normal decode schedule which designates a normal rate for decoding the encoded multimedia segment, the decoder being further configured to decode the encoded multimedia segment at a greater rate than the normal decode schedule, wherein the decoder is still further configured to determine whether to decode the encoded multimedia segment at a greater rate than the normal decode schedule when spare computing resources are otherwise available for doing so; a transformer, configured to receive the decoded multimedia segments and apply a transform, wherein the transform is selected from a group consisting of multimedia effects and multimedia transitions; a buffer configured to store decoded multimedia segments which the decoder has decoded at a greater rate than the normal decode schedule; a renderer configured to obtain decoded multimedia signals from the buffer and render the decoded multimedia signals at a normal rate for presentation; and a display presentation mechanism configured to playback rendered and decoded multimedia signals in a real-time and glitch-free manner.

8. A system as recited in claim 7, wherein the buffer is a dual-ported memory.

9. A system as recited in claim 7, wherein the buffer is a video memory.

10. A system as recited in claim 7, wherein the decoder is embodied, at least in part, in a processor-readable memory.

11. A system as recited in claim 7, wherein the decoder is embodied, at least in part, in hardware.

12. A system as recited in claim 7, wherein the transformer is embodied, at least in part, in a processor-readable memory.

13. A system as recited in claim 7, wherein the transformer is embodied, at least in part, in hardware.

14. A method, executed by at least one processing unit, the method comprising: receiving a playback command to initiate playback of an encoded multimedia segment, the encoded multimedia segment comprising at least one of a plurality media clips collected in a timeline of the video editing system, the segment having a defined normal decode schedule which designates a normal rate for decoding the multimedia segment; responsive to receiving the playback command, decoding the encoded multimedia segment at a greater rate than the normal decode schedule when spare computing resources are otherwise available; transforming the decoded multimedia segment by applying a transform to at least one of the plurality of media clips, wherein the transform is selected from a group consisting of multimedia effects and multimedia transitions; buffering in a system memory the decoded multimedia segment produced by the decoding; real-time glitch-free normal playback of the buffered and decoded multimedia segment, wherein the real-time glitch-free normal playback comprises rendering and presenting the buffered and decoded multimedia segment on a display.

15. A method as recited in claim 14, wherein the buffering occurs in a video memory.

16. A method as recited in claim 14, wherein one or more of acts are performed via dedicated hardware, where those acts are selected from decoding, transforming, buffering, and rendering.

* * * * *